US012688314B2

(12) United States Patent
Gu et al.

(10) Patent No.: US 12,688,314 B2
(45) Date of Patent: Jul. 21, 2026

(54) AUTHENTICATION AND IDENTIFICATION OF THIRD PARTIES USING GENERAL AND PERSONALIZED LARGE LANGUAGE MODELS

(71) Applicant: Gen Digital Inc., Tempe, AZ (US)

(72) Inventors: Lei Gu, Bedford, MA (US); Iskander Sanchez, Antibes (FR)

(73) Assignee: Gen Digital Inc., Tempe, AZ (US)

( * ) Notice: Subject to any disclaimer, the term of this patent is extended or adjusted under 35 U.S.C. 154(b) by 146 days.

(21) Appl. No.: 18/677,557

(22) Filed: May 29, 2024

(65) Prior Publication Data
US 2025/0371178 A1 Dec. 4, 2025

(51) Int. Cl.
*H04L 29/06* (2006.01)
*G06F 11/34* (2006.01)
*G06F 21/31* (2013.01)
*G06F 21/62* (2013.01)

(52) U.S. Cl.
CPC .......... *G06F 21/62* (2013.01); *G06F 11/3438* (2013.01); *G06F 21/31* (2013.01); *G06F 2221/2103* (2013.01)

(58) Field of Classification Search
CPC .................................................... G06F 21/62
See application file for complete search history.

(56) References Cited

U.S. PATENT DOCUMENTS

| | | | |
|---|---|---|---|
| 2024/0146734 A1* | 5/2024 | Southgate | G06F 21/6227 |
| 2025/0021967 A1* | 1/2025 | Ferenczi | G06Q 20/382 |

* cited by examiner

*Primary Examiner* — Jason K Gee
(74) *Attorney, Agent, or Firm* — AVEK IP, LLC; Mark C. Young

(57) ABSTRACT

A third-party attempting to call a user is identified and authenticated by collecting multi-dimensional user data and user activity into a personalized large language model (LLM) residing on a user device. A general-purpose LLM generates third-party authentication questions based on an initial intent of the caller and the questions are provided to the personalized LLM with the answers from the personalized LLM ranked based on relevancy and accuracy. One or more of the highest ranked questions are prompted to the caller and the answers provided by the caller are compared to the answers provided by the personalized LLM to determine if the caller is a trusted contact or a likely malicious third-party.

19 Claims, 4 Drawing Sheets

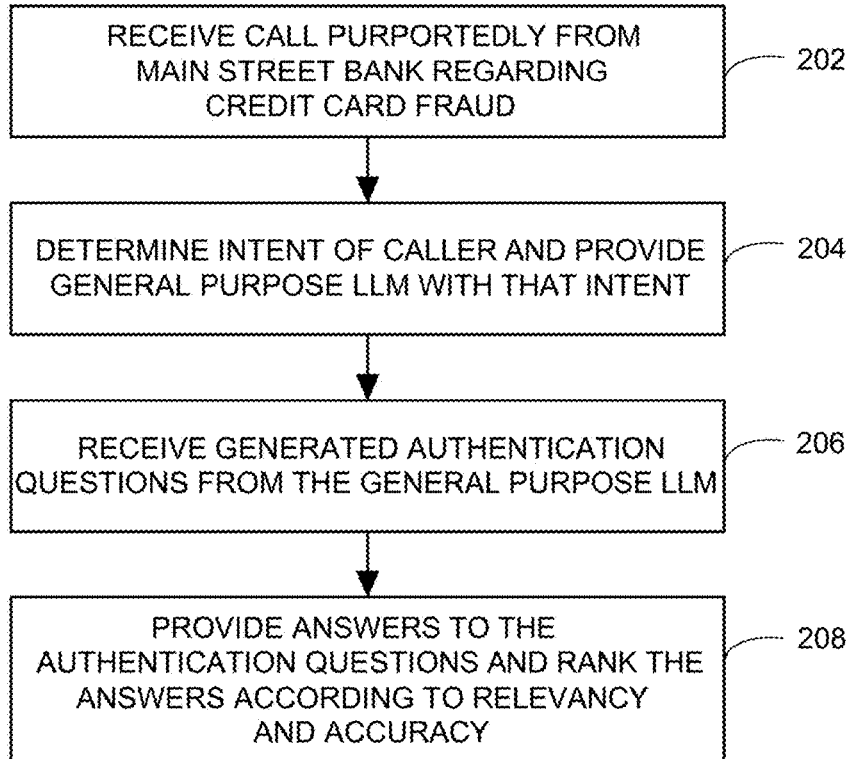

200

MULTI-DIMENSIONAL USER DATA

| DATE | TIME | ACTIVITY/DATA | SOURCE |
|------|------|---------------|--------|
| 06/23/23 | 11:00AM | MAIN STREET BANK (MSB) | GPS |
| 06/23/23 | 11:02AM | WITHDRAWAL $50 | MSB APP |
| 06/23/23 | 11:15AM | ARRIVE AT GAS STATION | GPS |
| 06/23/23 | 11:17AM | PURCHASE MSB CREDIT CARD | MSB APP |
| 06/23/23 | 11:20AM | TAKE PHOTO | CAMERA |
| 06/23/23 | 11:24AM | INCOMING TEXT FROM | PHONE 123-456-7890 |
| 06/23/23 | 11:26AM | OUTGOING TEXT TO | PHONE 123-321-1234 |
| 06/23/23 | 1:15PM | CHECK ACCOUNT BALANCE | PAYPAL APP |
| 06/23/23 | 2:56PM | CALL TO FURNITURE STORE | PHONE 123-123-4321 |
| 06/23/23 | 5:23PM | CALL FROM MSB | PHONE 321-321-3214 |
| 06/24/23 | 8:00AM | ACCOUNT BALANCE | MSB APP |

RECEIVE CALL PURPORTEDLY FROM MAIN STREET BANK REGARDING CREDIT CARD FRAUD — 202

DETERMINE INTENT OF CALLER AND PROVIDE GENERAL PURPOSE LLM WITH THAT INTENT — 204

RECEIVE GENERATED AUTHENTICATION QUESTIONS FROM THE GENERAL PURPOSE LLM — 206

PROVIDE ANSWERS TO THE AUTHENTICATION QUESTIONS AND RANK THE ANSWERS ACCORDING TO RELEVANCY AND ACCURACY — 208

FIG. 2

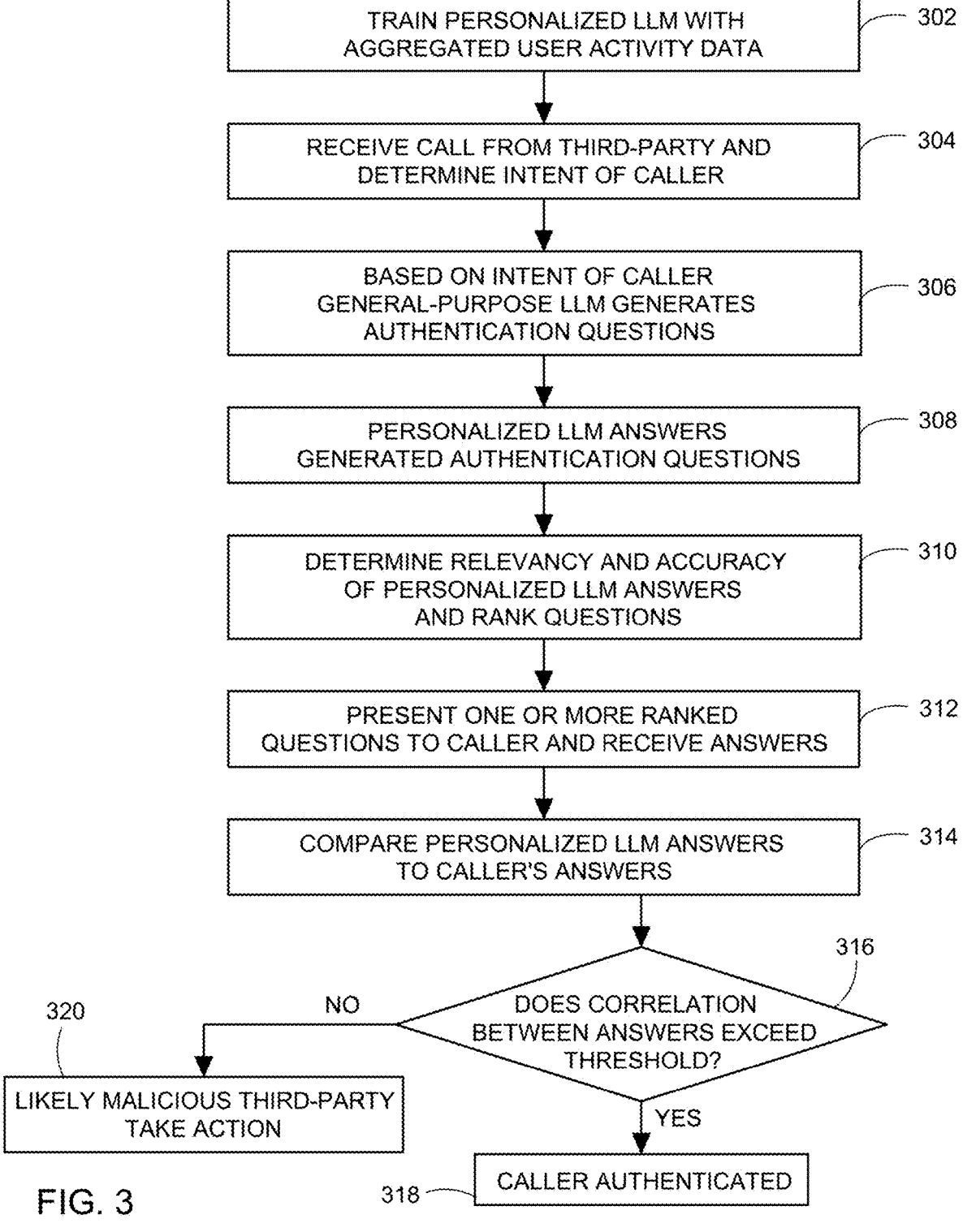

TRAIN PERSONALIZED LLM WITH
AGGREGATED USER ACTIVITY DATA — 302

RECEIVE CALL FROM THIRD-PARTY AND
DETERMINE INTENT OF CALLER — 304

BASED ON INTENT OF CALLER
GENERAL-PURPOSE LLM GENERATES
AUTHENTICATION QUESTIONS — 306

PERSONALIZED LLM ANSWERS
GENERATED AUTHENTICATION QUESTIONS — 308

DETERMINE RELEVANCY AND ACCURACY
OF PERSONALIZED LLM ANSWERS
AND RANK QUESTIONS — 310

PRESENT ONE OR MORE RANKED
QUESTIONS TO CALLER AND RECEIVE ANSWERS — 312

COMPARE PERSONALIZED LLM ANSWERS
TO CALLER'S ANSWERS — 314

DOES CORRELATION
BETWEEN ANSWERS EXCEED
THRESHOLD? — 316

NO

320

LIKELY MALICIOUS THIRD-PARTY
TAKE ACTION

YES

318 — CALLER AUTHENTICATED

FIG. 3

AUTHENTICATION AND IDENTIFICATION OF THIRD PARTIES USING GENERAL AND PERSONALIZED LARGE LANGUAGE MODELS

FIELD

The present invention relates generally to identification and authentication of third-parties attempting to obtain access to, or information from, a user, and more specifically to using a personalized large language model (LLM) and a general-purpose LLM to automatically generate third-party identification questions for identifying a third-party.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer wide-area network, it enables millions of users to access millions of other computers, often using handheld devices such as cell phones and tablet devices, by viewing web pages, sending text messages, sending e-mail, using dedicated applications (apps) for financial transactions, or by performing other computer-to-computer communication.

However, because the breadth and reach of the Internet is so large, it is not uncommon for malicious third parties to attempt to obtain access to other users' computers, devices, or accounts in a manner that poses a potential danger to those other users. For example, a malicious third-party may attempt to hack or log in to another user's computer, device, or account in order to steal, delete, or change information, including financial information. Or, a malicious third-party may contact an account owner or authorized user via phone, text, email, instant messaging, or via other apps or services, purporting to be a trusted business or other known contact of the user, and attempt to obtain a user's name, account ID, password, credentials, or other personal information associated with the user's identification in order to be able to directly access the user's apps or accounts, or to be able to impersonate the user in order to gain access to the user's apps, accounts, data, and the like.

Because originating phone numbers and email addresses may be easily spoofed, it can be somewhat simple to deceive an authorized user into believing that a scam phone call, text, email, or message originates from a person or organization trusted by the user when it, in fact, originates from a malicious third-party.

In order to prevent or alleviate such malicious third parties from gleaning any information from authorized users (or from the users' trusted contacts), while still allowing legitimate business calls, texts, or emails to reach a user, many systems for screening third parties from the user have been developed. For example, a user may employ an automated voice assistant to initially receive communications intended for the user, with the voice assistant attempting to identify the intent of the caller and identifying or authenticating the caller, typically by asking the caller and the user various questions to which each should know the answer and comparing the answers given by each to determine if the caller and/or user are who they purport to be.

While such question-and-answer authentication and call screening is somewhat effective, it is not foolproof and is not without drawbacks. For example, a list of questions for confirming the identity of a third-party or user is often limited to generic questions applicable to any user (e.g., "what city were you born in", "what is your mother's maiden name", etc.) and to which the user has previously supplied the answers to a trusted contact. Such predetermined questions and answers are often ineffective and outdated unless the list is regularly updated. This approach also burdens authorized users who must repeatedly answer the same questions for each authorization attempt and must keep the list of questions and answers up to date.

Furthermore, simplistic and predetermined authentication questions often rely on publicly available information that a malicious third-party may exploit to deceive the user. For example, a user's middle name, address, city of birth, birthdate, schools attended, and other information commonly used for verification question purposes can often be easily found simply by searching the Internet.

Thus, it can be seen that there remains a need in the art for improved identification of callers to authorized users to prevent malicious third parties from imitating a user's trusted contacts and obtaining personal information, passwords, or access to accounts from the authorized users.

SUMMARY

The present invention is directed to systems and methods for identifying and authenticating a third-party that is calling or otherwise attempting to contact a user, prior to allowing the attempted communication to proceed. As used herein, the terms "third-party" and "caller" refer to a caller not yet authenticated, once identified and authenticated the caller may be determined to be a known, legitimate contact of the user or may be determined to be a potentially malicious third-party. Also, as used herein, the term "call" and "calls" encompass any type of attempted communication with the user, including a telephonic voice call, text message, chat, email, or other electronic communication to the user.

In one exemplary embodiment, a virtual assistant on a user device includes a local, personalized large language model (LLM). The personalized LLM is trained from multidimensional data aggregated from private user data, including user app activity, user browser activity, user payment activity, user GPS and location data, and other user data collected locally and privately on the user device. When a caller attempts to contact a user, the virtual assistant communicates with the caller to determine an initial intent of the user, e.g., "who is the caller, and for what purpose is the caller calling?" Based upon the determined initial intent, a general-purpose LLM generates a plurality of third-party identification questions that would likely be known by the caller.

The plurality of third-party identification questions are input into the personalized LLM which generates answers based on the private user data as trained into the LLM, and those answers are ranked based on the relevancy and the accuracy of the answer. The virtual assistant then presents one or more of the questions having the highest ranked answers to the caller and the caller's answers to those questions are compared to the answers generated by the personalized LLM.

If the caller's answers correlate with the answers generated by the personalized LLM within a desired threshold, the caller is determined to be identified and/or authorized, and the call (or other communication) is allowed to proceed to the user. If the caller's answers do not correlate with the personalized LLM answers within a desired threshold, the caller is determined to be unidentified and/or unauthorized third-party and the virtual assistant may terminate the call, alert the user, or may further engage with the caller in order to attempt to obtain information about the caller.

The local, personalized LLM is preferably a small, targeted LLM stored on the user's device and is directed specifically to acquiring information relating to the user and the user's device, such as user app activity, user browser activity, user payment activity, user transaction activity, user proximity data, user communication data, and user GPS and location data. Because the personalized LLM is stored on the user's device, the collected information never leaves the user's control, preserving the user's privacy and security.

In one embodiment, the general-purpose LLM may be located on a central server, remote from the user device. In other embodiments, the general-purpose LLM may be located on the user device and incorporated into the virtual assistant.

In some embodiments, the general-purpose LLM may comprise a generative pretrained transformer (GPT), a recurrent neural network, another type of neural network, or other large language models.

The details of one or more exemplary embodiments are set forth in the accompanying drawings and the description below. Other features and advantages will be apparent from the description and drawings, and from the claims.

BRIEF DESCRIPTION OF THE FIGURES

FIG. 2 is a flow diagram showing operation of the personalized LLM in accordance with an exemplary embodiment of the present invention.

FIG. 3 is a flow diagram of an identification and authorization of a third-party process in accordance with an exemplary embodiment of the present invention.

DETAILED DESCRIPTION

Figure 1:
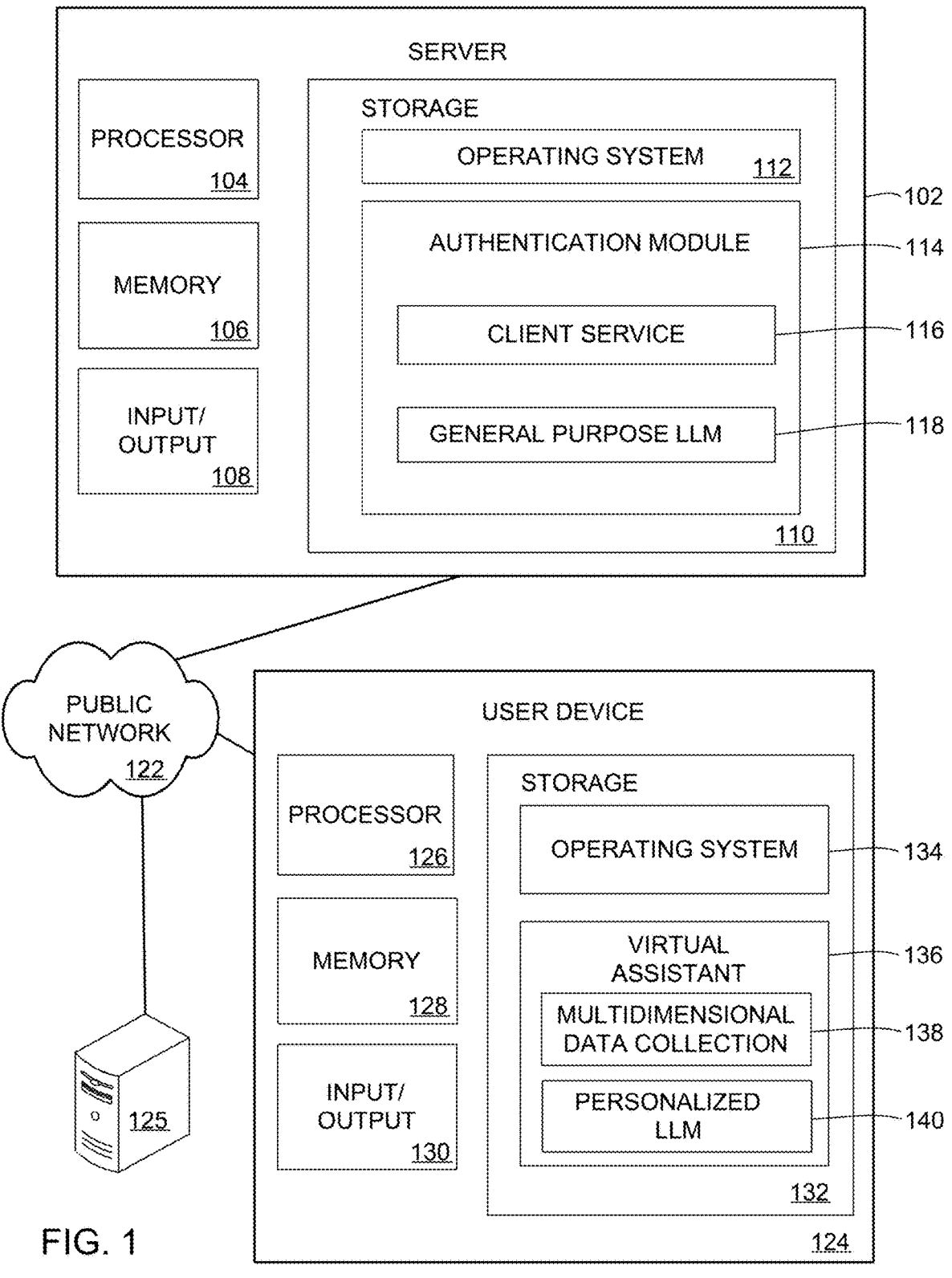
FIG. 1 is a block diagram of a system for authentication and identification of third parties using a local, personalized LLM and a general-purpose LLM in accordance with an exemplary embodiment of the present invention.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made. Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they convey has grown exponentially. Computers are now used to perform many tasks that were previously performed manually, such as online banking, investing, and other financial transactions. Because of the sensitive nature of such transactions, and because of the risk of loss if compromised, most computer applications require a user to set up an account to uniquely and positively identify each user. A user account historically involved a username (that may be publicly shared such as on a social media site) and a secret password that only the user knows, so that by entering the user name and password associated with the account, the user has uniquely and positively identified themselves to a computer system.

Password systems such as these rely on the password being known only to the user, being strong enough not to be guessed or calculated from stored encrypted password data, and being handled in a way that does not subject the password to accidental disclosure. Unfortunately, many users share passwords, write them down, or otherwise handle them in ways that are unsecure. Users are also prone to using predictable passwords such as words, meaningful calendar dates, and the like, making guessing passwords a practical method of attacking the security of a user's account. Similarly, passwords that are too short can be decoded from encrypted or hashed password files stored on networked computer systems' servers, such as by randomly or sequentially guessing passwords for a given user and checking them against the stored hashed version of the password to determine if the guess is correct. Still other attacks can leverage known weaknesses in password hashing functions, facilitating faster "brute force" attacks on guessing the stored passwords.

Passwords can also be disclosed inadvertently, such as by entering a password in an environment where it is subject to detection or interception. Reuse of passwords across multiple websites or other networked services provides a further means of attack, such as where a password (or a hashed password that can be decrypted) is inadvertently leaked from one website and can be used on other websites or online systems. Users may also forget their passwords, requiring a mechanism such as password reset that somehow verifies the user's identity as part of the reset. This has historically involved sending an email with a password reset link to the user, but such emails may be intercepted by people other than the user and rely on the security of the user's email account for user verification.

In addition to the threat of passwords being hacked by malicious third parties using computer techniques to access accounts and information without authorization, there is a growing threat of social engineering type attacks, in which a malicious third-party communicates with an authorized user to attempt to gain personal and/or sensitive information from the authorized user by masquerading as a trusted contact of the authorized user. For example, a malicious third-party may contact a user via telephone, text message, chat, or email, purporting to be a trusted contact, such as a representative of the user's bank. While engaging the user, the malicious third-party may be able to elicit account numbers, passwords, credit card numbers, birth dates, social security numbers, and other personal and sensitive information. Thus, there are a growing number of malicious phone calls, texts, emails, etc. purporting to be from trusted contacts of a user that are in fact from a malicious third-party attempting to glean some sensitive or personal information from the user.

Even users who may recognize that an incoming call (or other communication) is likely not authentic are inconvenienced with having to take the time to consider the communication and decide whether or not it is legitimate, and whether or not to answer or respond.

Embodiments of the present invention as described herein provide for authentication and identification of third parties using a local, personalized LLM and a general-purpose LLM.

In one exemplary embodiment, a virtual assistant on a user device includes a local, personalized large language model (LLM). The personalized LLM is trained from multidimensional data aggregated from private user data, including user app activity, user browser activity, user payment activity, user GPS and location data, and other user data collected locally and privately on the user device. When a caller attempts to contact a user, the virtual assistant communicates with the caller to determine an initial intent of the user, e.g., "who is the caller, and for what purpose is the caller calling?" Based upon the determined initial intent, a general-purpose LLM generates a plurality of third-party identification questions that would likely be known by the caller.

The plurality of third-party identification questions are input into the personalized LLM which generates answers based on the private user data as trained into the LLM, and those answers are ranked based on the relevancy and the accuracy of the answer. The virtual assistant then presents one or more of the questions having the highest ranked answers to the caller and the caller's answers to those questions are compared to the answers generated by the personalized LLM.

If the caller's answers correlate with the answers generated by the personalized LLM within a desired threshold, the caller is determined to be identified and/or authorized, and the call (or other communication) is allowed to proceed to the user. If the caller's answers do not correlate with the personalized LLM answers within a desired threshold, the caller is determined to be unidentified and/or unauthorized third-party and the virtual assistant may terminate the call, alert the user, or may further engage with the caller in order to attempt to obtain information about the caller.

The system and method of the various embodiments are preferably embodied on a user device such as a smartphone, tablet, or personal computer such that the local, personalized LLM is contained securely on the user device. In some embodiments the general-purpose LLM may be likewise contained on the user device, in other embodiments it may distributed to a remote server, another computing device, or any combination thereof.

Looking first to FIG. 1, a block diagram of a system for authentication and identification of third parties using a local, personalized LLM and a general-purpose LLM in accordance with an exemplary embodiment of the present invention is depicted. In this embodiment a server 102 includes a processor 104 operable to execute computer program instructions and a memory 106 operable to store information such as program instructions and other data while server 102 is operating. The server exchanges electronic data, receives input from a user, and performs other such input/output operations via input/output 108. Storage 110 may include non-transitory, non-volatile memory that stores program instructions including an operating system 112 that provides an interface between software or programs available for execution and the hardware of the server and manages other functions such as access to input/output devices. The storage 110 also stores program instructions and other data for an authentication module 114, including client service 116 and general-purpose LLM 118. The server 102 is also coupled via a public network 122 to one or more user devices 124, such as a user's smartphone or other remote client computerized device 125.

The user device 124 is preferably a smartphone, tablet, laptop, or other smart device operable to communicate with other computerized devices over the network to allow the user to communicate with others and to access websites, web pages, accounts, and the like. One or more communications paths within the user device 124 allow the user device to enable or disable a phone call, text, email or other incoming or outgoing communication to or from the device. User device 124 preferably includes a processor 126, a memory 128, and input/output 130 including various sensors and components such as a camera, a Global Positioning System (GPS) receiver, a speaker and a microphone, and other such components as may be found in personal computers, smartphones, and the like. Storage 132 stores an operating system 134 and program information such as virtual assistant app 136 that in operation may be loaded into memory 128 and executed via processor 126 to perform various functions as described herein. The virtual assistant 136 is further operable to provide automated communication to and from the user device to allow the virtual assistant 136 to communicate via voice, text, email, or other messaging app to automatically respond to attempted communications with the user, and to communicate authentication questions to the caller as will be described in more detail below.

In operation, the server 102 operates an authentication module 114 having a client service app 116 that facilitates communication with user device 124, and a general-purpose LLM 118 configured to receive from the user device 124 a communication of an initial intent of a caller to the user device and in response provide a plurality of third-party identification questions to the user device 124. For example, if a call or communication to the user device 124 purports to be from Main Street Bank in regard to fraudulent activity on a user's credit card, the general-purpose LLM may generate third-party identification questions that would have answers that should be known by the user, such as "when did you last log in to your account?", "what was the last balance of your account?", or "where did you use your card yesterday?" Those generated authentication questions are communicated from server 102 to the user device 124.

At user device 124, the virtual assistant 136 is operable to receive incoming calls or communications and to screen or authenticate the caller before allowing the incoming call, text, or email to reach the user. For example, continuing the example above, if an incoming call purporting to be from Main Street Bank (e.g., based on the caller ID information and/or based on a statement from the caller) is received by the user device 124, the virtual assistant 136 will answer that call and engage in communication with the caller to ascertain the reason for the call. Upon determining the purpose of the call, as described above, the virtual assistant communicates to the server 102 the initial intent of the call (e.g., purported credit card fraud reported by Main Street Bank) and receives from the general-purpose LLM 118 of the server via the client service 116 of the server 102 the plurality of generated authentication questions.

The received plurality of third-party identification questions from the server 102 are input into the personalized LLM 140 which generates answers based on private user data as trained into the personalized LLM (as will be described in more detail below), and the answers from the personalized LLM 140 are ranked based on the relevancy and the accuracy of the answer. The virtual assistant then presents or prompts one or more of the questions having the highest ranked answers to the caller. The caller's answers to those questions are then compared to the answers to those same questions as generated by the personalized LLM 140 and ranked as to the degree of correlation with the answers provided by the personalized LLM.

If the caller's answers to the presented questions correlate with the answers generated by the personalized LLM within a desired threshold, the caller is determined to be identified and/or authorized, and the call (or other communication) is allowed to proceed to the user. If the caller's answers do not correlate with the personalized LLM answers within a desired threshold, the caller is determined to be unidentified and/or unauthorized third-party and the virtual assistant may terminate the call, alert the user, or may further engage with the caller in order to attempt to obtain information about the caller. Preferably, the threshold degree of correlation between the caller's answers and the answers provided by the personalized LLM is at least eighty percent in order to determine that the caller is not a likely malicious third-party.

In alternative embodiments, it should be understood that they general-purpose LLM 118 may be located on the user device 124 so that all authorization may be done directly at the user device 124 without the need to communicate with central server 102. Preferably, the personalized LLM is stored only on the user device 124 so that the aggregated information comprising the LLM remains under the control of the user, with only the determined initial intent of the caller sent to other devices and/or servers as necessary. Thus, in a preferred embodiment, the user device 124 may include all of the functionality of the server 102 with respect to the general-purpose LLM and the generation of authentication questions as described herein.

In other examples, some of the functions performed on user device 124 in the example of FIG. 1 may be performed in whole or in part by external systems, such as multidimensional collection of user data from third parties and authentication processes executed via a web browser rather than via a dedicated app or process executing on the user device.

In some embodiments, the general-purpose LLM and the personalized LLM may be any type of LLM as known in the art, and may include recurrent neural networks or other neural networks, or other such technology similarly operable to process language. In other embodiments, the general-purpose LLM may comprise a generative pretrained transformer (GPT), a recurrent neural network, another type of neural network, or other large language models.

Turning to FIG. 2, training and implementation of the personalized LLM 140 as described above with respect to FIG. 1 is depicted with the aggregation of user data and the determination and ranking of answers to the authentication questions generated by the general-purpose LLM 118 in accordance with an exemplary embodiment of the present invention.

At 200, a data set of user data and activity is shown, such as may be collected by the user's smartphone via a multidimensional data collection module such as that shown at 138 of FIG. 1. The user data and activity may comprise a date, time, a description of the activity or data, and source of the data from a user device, such as user device 124 in FIG. 1. As can be seen, the user device 124 may collect a multitude of user activity and user data including a user's location, calls and texts received and sent, financial transactions, account balances, and the like. It should be understood that the limited data presented in FIG. 2 is merely representative of a small fraction of the data that a typical user device may collect, with virtually every keystroke event, call, text, email, and transaction performed on the device a candidate for inclusion in the aggregated data used to train the personalized LLM 124 on the device. The collected and aggregated user data is used to train the personalized LLM 124 so that the personalized LLM will be able to respond to queries with answers based on the aggregated data it was trained with.

In this simplified example, it can be seen that there are several data points associated with Main Street Bank. Thus, the personalized LLM 140, trained with this data set, will have access to, and will be able to answer questions related to, that bank activity.

Looking still to FIG. 2, at blocks 202 through 208 the operation of the personalize LLM 140 continues the example set forth above with respect to a call received by the user on user device 124 purporting to be from Main Street Bank regarding potential credit card fraud.

At block 202, the virtual assistant 136 receives the call and engages the caller to determine that the caller purports to be from Main Street Bank and is attempting to contact the user about credit card fraud.

At block 204, the virtual assistant determines the intent of the caller and provides that intent to the general-purpose LLM by, in this example, transmitting the intent to the server 102.

At block 206, the personalized LLM receives from the general-purpose LLM the generated authentication questions.

At block 208, the personalized LLM provides answers to the received authentication questions and further ranks the answers to the questions based on the relevancy and accuracy of the answers.

In some embodiments, ranking of the relevancy and accuracy of the answers provided by the personalized LLM may include searching for certain keywords and/or numbers or values that are a part of the correct answer, searching for words related to certain keywords, using artificial intelligence such as a separate large language model to determine whether the provided answer is correct, of other such methods.

With the training and operation of the personalized LLM and the interaction of the personalized LLM 140 and general-purpose LLM 118 set forth above, turning to FIG. 3, with reference back to the user device 124 and server 102 of FIG. 1, a flow diagram of an exemplary process of authentication and identification of third parties using a local, personalized LLM and a general-purpose LLM in accordance with an exemplary embodiment of the present invention is depicted.

Beginning at block 302, the personalized LLM 140 is trained with user data. As described above with respect to FIG. 2, the user data may comprise user data and activity such as may be collected by the user's smartphone via a multi-dimensional data collection module such as that shown at 138 of FIG. 1. The user data and activity may comprise dates, times, a description of the activity or data, and source of the data from a user device. The user device 124 may collect a multitude of user activity and user data including a user's location, calls and texts received and sent, financial transactions, account balances, and the like.

With user data collected, at block 304 the user device 124 received a call (or other communication) from a third-party.

The virtual assistant 136 initially receives or intercepts the call before the call or communication is propagated to the user, and determines an initial intent of the caller as described above—i.e., "who is calling and what information do they want?"—as described above.

At block 306, based on the determined intent of the caller, the general-purpose LLM generates a plurality of third-party authentication questions.

At block 308, the generated authentication questions are input to the personalized LLM and the personalized LLM generates answers to those questions.

At block 310, the relevancy and accuracy of the answers provided by the personalized LLM are determined as described above, and the generated questions are ranked according to the determined relevancy and accuracy.

At block 312, one or more of the ranked questions are presented or prompted to the caller, and the caller's answers to those question(s) are received, and at block 314 the caller's answers are compared to the answers provided by the personalized LLM.

At block 316, the correlation between the answers provided by the caller and the answers provided by the personalized LLM is determined, preferably as a percentage. If the determined correlation exceeds a predetermined threshold, then at block 318 the caller is authenticated, i.e., determined to not be a malicious third-party, and the call (or other communication) is allowed to proceed to the user via the user device.

If, at block 316, the determined correlation does not reach the required predetermined threshold of correlation, then, at block 320, the caller is determined to likely be a malicious third-party and an action is taken, such as terminating the call (or ceasing and/or blocking further communication), or further engaging the caller to attempt to glean further information about the malicious caller's identity and tactics.

Thus, the system and method as described allow the virtual assistant in tandem with the personalized LLM and the general-purpose LLM to effectively screen calls and communications to a user device, determine the intent of the caller, and determine whether the caller is a potential malicious third-party or a trusted contact of the user automatically, without the user having to answer any questions or otherwise interact with the caller until the authentication process is completed.

Figure 4:
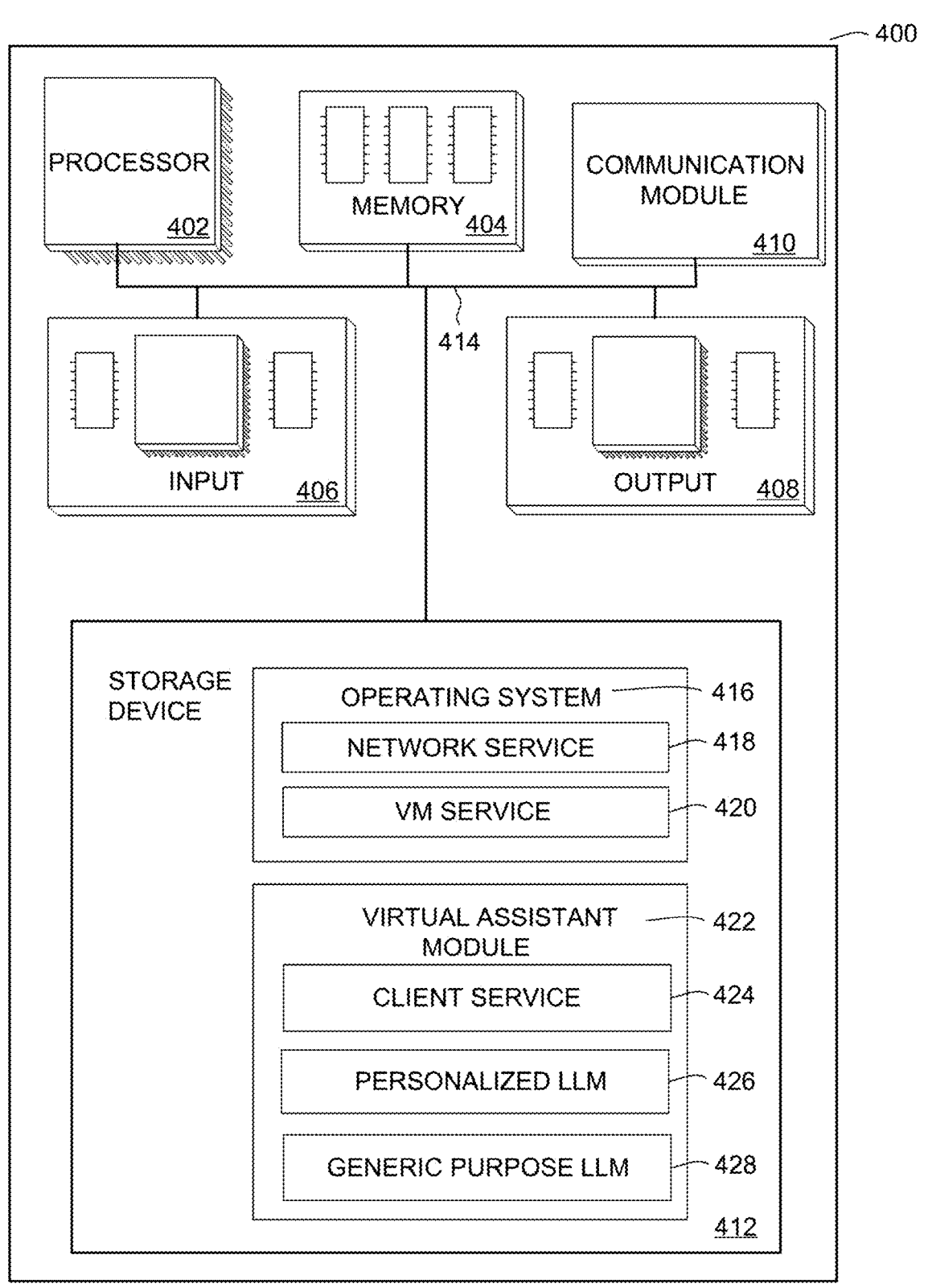
FIG. 4 is a block diagram of a computerized system for authentication and identification of third parties using a local, personalized LLM and a general-purpose LLM in accordance with an exemplary embodiment of the present invention.

FIG. 4 is a computerized system, such as a user device similar to user device 124 of FIG. 1, in which the general-purpose LLM and the personalize LLM both reside directly on the user device. Thus, the operation of the system and method for authentication and identification of third parties using general and personalized large language models is similar to that as described above with respect to FIG. 1, except that the virtual assistant, personalized LLM, and general-purpose LLM all reside directly on the user device with no central server or communication with a central server necessary.

Although computing device 400 is shown as a standalone computing device, preferably a user device, computing device 400 may be any component or system that includes one or more processors or another suitable computing environment for executing software instructions in other examples, and need not include all of the elements shown here.

As shown in the specific example of FIG. 4, computing device 400 includes one or more processors 402, memory 404, one or more input devices 406, one or more output devices 408, one or more communication modules 410, and one or more storage devices 412. Computing device 400 in one example further includes an operating system 416 executable by computing device 400. The operating system includes in various examples services such as a network service 418 and a virtual machine service 420 such as a virtual server. One or more applications, such as a virtual assistant module 422 are also stored on storage device 412, and are executable by computing device 400.

Each of components 402, 404, 406, 408, 410, and 412 may be interconnected (physically, communicatively, and/or operatively) for inter-component communications, such as via one or more communications channels 414. In some examples, communication channels 414 include a system bus, network connection, inter-processor communication network, or any other channel for communicating data. Applications such as virtual assistant module 422 and operating system 416 may also communicate information with one another as well as with other components in computing device 400.

Processors 402, in one example, are configured to implement functionality and/or process instructions for execution within computing device 400. For example, processors 402 may be capable of processing instructions stored in storage device 412 or memory 404. Examples of processors 402 include any one or more of a microprocessor, a controller, a digital signal processor (DSP), an application specific integrated circuit (ASIC), a field-programmable gate array (FPGA), or similar discrete or integrated logic circuitry.

One or more storage devices 412 may be configured to store information within computing device 400 during operation. Storage device 412, in some examples, is known as a computer-readable storage medium. In some examples, storage device 412 comprises temporary memory, meaning that a primary purpose of storage device 412 is not long-term storage. Storage device 412 in some examples is a volatile memory, meaning that storage device 412 does not maintain stored contents when computing device 400 is turned off. In other examples, data is loaded from storage device 412 into memory 404 during operation. Examples of volatile memories include random access memories (RAM), dynamic random access memories (DRAM), static random access memories (SRAM), and other forms of volatile memories known in the art. In some examples, storage device 412 is used to store program instructions for execution by processors 402. Storage device 412 and memory 404, in various examples, are used by software or applications running on computing device 400 such as virtual assistant module 422 to temporarily store information during program execution.

Storage device 412, in some examples, includes one or more computer-readable storage media that may be configured to store larger amounts of information than volatile memory. Storage device 412 may further be configured for long-term storage of information. In some examples, storage devices 412 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication modules 410. Computing device 400 in one example uses communication module 410 to communicate with external devices via one or more networks, such as one or more wireless networks. Communication module 410 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 400 uses communication module 410 to communicate with an external device such as via public network 122 of FIG. 1.

Computing device 400 also includes in one example one or more input devices 406. Input device 406, in some examples, is configured to receive input from a user through tactile, audio, or video input. Examples of input device 406 include a touchscreen display, a mouse, a keyboard, a voice-responsive system, a video camera, a microphone, or any other type of device for detecting input from a user.

One or more output devices 408 may also be included in computing device 400. Output device 408, in some examples, is configured to provide output to a user using tactile, audio, or video stimuli. Output device 408, in one example, includes a display, a sound card, a video graphics adapter card, or any other type of device for converting a signal into an appropriate form understandable to humans or machines. Additional examples of output device 408 include a speaker, a light-emitting diode (LED) display, a liquid crystal display (LCD), or any other type of device that can generate output to a user.

Computing device 400 may include operating system 416. Operating system 416, in some examples, controls the operation of components of computing device 400, and provides an interface from various applications such as virtual assistant module 422 to components of computing device 400. For example, operating system 416, in one example, facilitates the communication of various applications such as virtual assistant module 422 with processors 402, communication module 410, storage device 412, input device 406, and output device 408. Applications such as virtual assistant module 422 may include program instructions and/or data that are executable by computing device 400. As one example, virtual assistant module 422 uses client service 424 to interface between the personalized LLM 426 and the general-purpose LLM 428 to implement the method of authentication and identification of third parties using general and personalized large language models as described herein.

Although specific embodiments have been illustrated and described herein, any arrangement that achieves the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of authenticating a third-party in a computerized system, comprising:

collecting multi-dimensional user data on a user device into a personalized large language model (LLM) residing on the user device;

receiving a communication from a third-party and determining an intent of the third party based on information in the communication;

generating, by a general-purpose LLM, a plurality of authentication questions based on the determined intent;

providing the plurality of authentication questions to the personalized LLM and receiving from the personalized LLM a plurality of corresponding answers generated based on the multi-dimensional user data;

presenting the plurality of authentication questions to the third party and receiving from the third-party a plurality of corresponding answers;

comparing the plurality of answers from the personalized LLM to the plurality of answers from the third-party and determining whether the third-party is likely malicious based on a result of the comparison; and based on a determination that the third-party is likely malicious, automatically terminating in the user device a communication path with the third-party.

2. The method of authenticating a third-party in a computerized system of claim 1, wherein collecting multi-dimensional user data comprises collecting user activity via a smartphone.

3. The method of authenticating a third-party in a computerized system of claim 1, wherein the personalized LLM comprises one or more of a neural network or a recurrent neural network.

4. The method of authenticating a third-party in a computerized system of claim 1, wherein the multi-dimensional user data comprises one or more of geographic location, purchase history, financial transaction data, electronic messaging, and app usage.

5. The method of authenticating a third-party in a computerized system of claim 1, wherein the general-purpose LLM comprises one or more of a neural network, a recurrent neural network, or a generative pre-trained transformer.

6. The method of authenticating a third-party in a computerized system of claim 1, wherein the determination that the third-party is likely malicious comprises determining a correlation between the answers from the personalized LLM and the answers from the third party.

7. The method of authenticating a third-party in a computerized system of claim 6, wherein the determination that the third-party is likely malicious further comprises comparing the determined correlation to a predetermined threshold.

8. The method of authenticating a third-party in a computerized system of claim 1, wherein the general-purpose LLM and the personalized LLM both reside on the user device.

9. The method of authenticating a third-party in a computerized system of claim 1, wherein presenting the plurality of authentication questions to the third party and receiving from the third-party a plurality of corresponding answers comprises communicating with the third party via a voice call, a text message, or an email.

10. The method of authenticating a third-party in a computerized system of claim 1, wherein the personalized LLM is trained using the multi-dimensional user data.

11. A computing device, comprising:

a processor and a non-volatile storage, the non-volatile storage comprising instructions that when executed on the computing device cause the computing device to:

collect multi-dimensional user data on a user device into a personalized large language model (LLM) residing on the user device;

receive a communication from a third-party and determining an intent of the third party based on information in the communication;

generate, by a general-purpose LLM, a plurality of authentication questions based on the determined intent;

provide the plurality of authentication questions to the personalized LLM and receive from the personalized LLM a plurality of corresponding answers generated based on the multi-dimensional user data;

present the plurality of authentication questions to the third party and receive from the third-party a plurality of corresponding answers;

compare the plurality of answers from the personalized LLM to the plurality of answers from the third-party and determining whether the third-party is likely malicious based on a result of the comparison; and based on a determination that the third-party is likely malicious, automatically terminate in the user device a communication path with the third-party.

12. The computing device of claim 11, wherein collecting multi-dimensional user data comprises collecting user activity via a smartphone.

13. The computing device of claim 11, wherein the personalized LLM comprises one or more of a neural network or a recurrent neural network.

14. The computing device of claim 11, wherein the multi-dimensional user data comprises one or more of geographic location, purchase history, financial transaction data, electronic messaging, and app usage.

15. The computing device of claim 11, wherein the general-purpose LLM comprises one or more of a neural network, a recurrent neural network, or a generative pre-trained transformer.

16. The computing device of claim 11, wherein the determination that the third-party is likely malicious comprises determining a correlation between the answers from the personalized LLM and the answers from the third party.

17. The computing device of claim 16, wherein the determination that the third-party is likely malicious further comprises comparing the determined correlation to a pre-determined threshold.

18. The computing device of claim 11, wherein presenting the plurality of authentication questions to the third party and receiving from the third-party a plurality of corresponding answers comprises communicating with the third party via a voice call, a text message, or an email.

19. The computing device of claim 11, wherein the personalized LLM is trained using the multi-dimensional user data.

* * * * *